United States Patent Office.

GEORGE W. CHATFIELD, OF NEW HAVEN, CONNECTICUT.

Letters Patent No. 101,096, dated March 22, 1870.

IMPROVED MEDICINE OR COUGH-SIRUP.

The Schedule referred to in these Letters Patent and making part of the same

*To all whom it may concern:*

Be it known that I, GEORGE W. CHATFIELD, of New Haven, in the county of New Haven and State of Connecticut, have invented a new Cough-Sirup; and I do hereby declare the following to be a full, clear, and exact description of the same.

This invention relates to a sirup or cure for coughs and similar difficulties, and consists in a compound formed from the articles in the proportions, and substantially as hereinafter named.

I first take—flaxseed, three-fourths pound; manna, one and one-fourth pound; boneset, three-fourths pound; slippery-elm bark, three-fourths pound; aniseseed, one and one-half pound; licorice stick, nine pounds; senna, one and one-fourth pound; raisins, one pound.

Place these in six gallons of water, and let it steep slowly for one day. I then press the whole to express the fluid therefrom, and to the residue, after pressing, I add four gallons of water, and steep in like manner for one more day, which second steeping extracts all that is desirable from the herbs. Then to the whole fluid pressed or strained from the herbs I add thirty-six pounds of loaf sugar and boil for two hours, and about twenty minutes before the boiling ceases I add three gallons of alcohol, and at the expiration of two hours allow it to cool, and settle for about one week, more or less, then drain off the liquid and my sirup is ready for market and use.

The dose for children is from one-half to two teaspoonfuls, according to age, three or four times a day. For adults, three teaspoonfuls.

I claim as my invention—

The herein-described cough sirup, consisting of the ingredients and in the proportions combined, substantially as set forth.

GEORGE W. CHATFIELD.

Witnesses:
   A. J. TIBBITS,
   J. H. SHUMWAY.